United States Patent
Wang et al.

(10) Patent No.: US 10,234,995 B2
(45) Date of Patent: Mar. 19, 2019

(54) INFRARED TOUCH SCREEN AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Huan Wang, Beijing (CN); Mookeun Shin, Beijing (CN); Zhizhong Tu, Beijing (CN); Yong Jun Yoon, Beijing (CN)

(73) Assignees: BOE TECHNOLOGY GROUP CO., LTD., Beijing (CN); HEFEI XINSHENG OPTOELECTRONCIS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/762,594

(22) PCT Filed: Oct. 21, 2014

(86) PCT No.: PCT/CN2014/089048
§ 371 (c)(1),
(2) Date: Jul. 22, 2015

(87) PCT Pub. No.: WO2016/008227
PCT Pub. Date: Jan. 21, 2016

(65) Prior Publication Data
US 2016/0246447 A1 Aug. 25, 2016

(30) Foreign Application Priority Data
Jul. 15, 2014 (CN) .......................... 2014 1 0336365

(51) Int. Cl.
G06F 3/042 (2006.01)
G06F 3/041 (2006.01)

(52) U.S. Cl.
CPC .......... *G06F 3/0421* (2013.01); *G06F 3/0412* (2013.01)

(58) Field of Classification Search
CPC ....... G06F 3/042; G06F 3/0423; G06F 3/0428
See application file for complete search history.

(56) References Cited

U.S. PATENT DOCUMENTS

| 4,737,634 A | 4/1988 | Sasaki et al. |
| 9,652,082 B1 * | 5/2017 | Lin .................. G06F 3/0421 |
| | | (Continued) |

FOREIGN PATENT DOCUMENTS

| CN | 101424993 A | 5/2009 |
| CN | 101669088 A | 3/2010 |
| | (Continued) | |

OTHER PUBLICATIONS

International Search Report Appln. No. PCT/CN2014/089048; dated Apr. 20, 2015.

(Continued)

*Primary Examiner* — William Boddie
*Assistant Examiner* — Jeffrey Parker
(74) *Attorney, Agent, or Firm* — Ladas & Parry LLP

(57) ABSTRACT

An infrared touch screen in of a quadrilateral shape is disclosed. The infrared touch screen is provided with a plurality of light sources at its first side and provided with a plurality of first detecting units at its second side opposite to the first side, and is provided with a plurality of second detecting units respectively at its third side and its fourth side which are opposite to each other, and the first detecting units and the second detecting unit are all configured to partly receive and partly reflect the infrared light emitted by the light sources, so that the infrared light emitted by the light sources can form criss-crossing light paths. The infrared touch screen achieves lowered power consumption and improved touch performance.

12 Claims, 6 Drawing Sheets

(56) References Cited

U.S. PATENT DOCUMENTS

| | | | |
|---|---|---|---|
| 2008/0266266 A1* | 10/2008 | Kent | G06F 3/0436 |
| | | | 345/173 |
| 2010/0238136 A1* | 9/2010 | Chang | G06F 3/042 |
| | | | 345/175 |
| 2012/0293461 A1 | 11/2012 | Choi | |
| 2013/0055080 A1* | 2/2013 | Komer | G06F 3/0421 |
| | | | 715/709 |
| 2014/0028588 A1 | 1/2014 | Neveu et al. | |

FOREIGN PATENT DOCUMENTS

| | | |
|---|---|---|
| CN | 201444297 U | 4/2010 |
| CN | 102087562 A | 6/2011 |
| CN | 102789338 A | 11/2012 |
| CN | 103235670 A | 8/2013 |
| CN | 103268173 A | 8/2013 |

OTHER PUBLICATIONS

Written Opinion of the International Searching Authority Appln. No. PCT/CN2014/089048; dated Apr. 20, 2014.
Second Chinese Office Action dated Feb. 28, 2017; Appln. No. 201410336365.1.
First Chinese Office Action dated Aug. 24, 2016, Appln. No. 201410336365.1.

* cited by examiner

| Touch points | 1 | 2 | 3 | 4 | 5 | 6 | 7 | 8 | 9 |
|---|---|---|---|---|---|---|---|---|---|
| First detecting unit 21-1 | × | ✓ | ✓ | × | ✓ | ✓ | × | ✓ | ✓ |
| First detecting unit 21-2 | ✓ | ✓ | ✓ | ✓ | ✓ | ✓ | ✓ | ✓ | ✓ |
| First detecting unit 21-3 | ✓ | ✓ | ✓ | ✓ | ✓ | ✓ | ✓ | ✓ | ✓ |
| First detecting unit 21-4 | ✓ | × | ✓ | ✓ | × | ✓ | ✓ | × | ✓ |
| First detecting unit 21-5 | ✓ | ✓ | ✓ | ✓ | ✓ | ✓ | ✓ | ✓ | ✓ |
| First detecting unit 21-6 | ✓ | ✓ | × | ✓ | ✓ | × | ✓ | ✓ | × |
| First detecting unit 21-7 | ✓ | ✓ | × | ✓ | ✓ | × | × | × | × |
| First detecting unit 21-8 | ✓ | ✓ | ✓ | × | ✓ | ✓ | ✓ | ✓ | ✓ |
| First detecting unit 21-9 | ✓ | × | ✓ | × | × | × | ✓ | × | ✓ |
| First detecting unit 21-10 | ✓ | ✓ | ✓ | ✓ | ✓ | ✓ | ✓ | ✓ | ✓ |
| First detecting unit 21-11 | × | ✓ | ✓ | ✓ | ✓ | ✓ | ✓ | ✓ | ✓ |
| First detecting unit 21-12 | × | ✓ | ✓ | × | ✓ | ✓ | × | ✓ | ✓ |
| Second detecting unit 31-1 | × | ✓ | ✓ | × | ✓ | ✓ | × | ✓ | ✓ |
| Second detecting unit 31-2 | × | ✓ | ✓ | ✓ | ✓ | ✓ | ✓ | ✓ | ✓ |
| Second detecting unit 31-3 | ✓ | ✓ | ✓ | ✓ | ✓ | ✓ | ✓ | ✓ | ✓ |
| Second detecting unit 31-4 | ✓ | × | ✓ | ✓ | × | ✓ | ✓ | × | ✓ |
| Second detecting unit 31-5 | ✓ | × | ✓ | × | ✓ | ✓ | ✓ | ✓ | ✓ |
| Second detecting unit 31-6 | ✓ | ✓ | × | ✓ | ✓ | × | ✓ | ✓ | × |
| Second detecting unit 31-7 | × | × | × | × | ✓ | ✓ | × | ✓ | ✓ |
| Second detecting unit 31-8 | × | × | ✓ | ✓ | ✓ | ✓ | ✓ | ✓ | ✓ |
| Second detecting unit 31-9 | ✓ | ✓ | ✓ | ✓ | ✓ | ✓ | ✓ | ✓ | ✓ |
| Second detecting unit 31-10 | ✓ | × | ✓ | × | × | × | ✓ | × | ✓ |
| Second detecting unit 31-11 | ✓ | × | ✓ | × | ✓ | ✓ | ✓ | ✓ | ✓ |
| Second detecting unit 31-12 | ✓ | × | × | ✓ | ✓ | × | × | × | × |

FIG. 9

INFRARED TOUCH SCREEN AND DISPLAY DEVICE

TECHNICAL FIELD

Embodiments of the present invention relate to an infrared touch screen and a display device.

BACKGROUND

With the increasing of multi-media information search devices, people use touch screens more and more. The touch screens can not only be used for multimedia information search, but also have advantages such as being firm and durable, quick reaction, saving space and communication friendly. By way of the touch screen technology, a user can operate a host machine as long as a finger slightly touches an icon or character at the display screen of a computer, and thereby Human-Computer Interaction is more direct. The technology brings much convenience to a user who does not understand computer operation.

According to working principles and media of information transmission of the touch screens, the touch screens can be divided into four types: resistance type, capacitance induction type, infrared ray type and surface sound wave type. An infrared touch screen is not interfered by electric current, voltage or static electricity, and is adapted to severe environments, thus an infrared ray technology is one of the development tendencies of touch screen products.

Traditional infrared touch screens usually are provided with a circuit board frame in front of a display screen, for the circuit board frame, infrared emitting tubes are arranged at two adjacent sides of a quadrilateral screen, and infrared receiving tubes are arranged at the other two adjacent sides of the quadrilateral screen. Generally, the infrared emitting tubes and the infrared receiving tubes are respectively located at two sides of the screen opposite to each other, and the infrared emitting tubes and the infrared receiving tubes are arranged corresponding to each other one by one. The infrared emitting tubes emit infrared ray and the infrared receiving tubes receive the infrared ray so as to form infrared matrixes, arranged densely in directions X and Y, which are used to detect and locate a user's touch. The traditional infrared touch screens have a complex structure, require high design accuracy, also, due to a large number of the infrared emitting tubes, the power consumption of the touch screen is relative large.

SUMMARY

Embodiments of the present invention provide an infrared touch screen and a display device. The number of the light sources in the infrared touch screen decreases greatly, and thus the power consumption of the infrared touch screen is lowered and the touch performance of the infrared touch screen is improved.

Embodiments of the present invention provide an infrared touch screen, the infrared touch screen is of a quadrilateral shape, and the infrared touch screen is arranged with a plurality of light sources at its first side and arranged with a plurality of first detecting units at its second side opposite to the first side, and is arranged with a plurality of second detecting units respectively at its third side and its fourth side opposite to each other, both the first detecting units and the second detecting units can partially receive and partially reflect the infrared rays emitted from the light sources, so that the infrared rays emitted from light sources form criss-crossing light paths.

For example, a number of the light sources is equal to that of the first detection units which correspond to the light sources one by one; a number of the second detecting units at the third side is equal to that of the second detecting units at the fourth side, the second detecting units at the third side and the second detecting units at the fourth side corresponding to each other one by one; and the number of the first detecting units is greater than or equal to that of the second detecting units at the third side.

For example, the first detecting units each include a first receiver and a first beam splitter facing the light sources, and the first beam splitter and the first receiver correspond to each other and the first beam splitter is nearer to the light sources than the first receiver; the second detecting units at the third side include a second beam splitter and a second receiver facing away from to the third side, and the second beam splitter and the second receiver at the third side correspond to each other and the second beam splitter is farther from the third side than the second receiver; the second detecting units at the fourth side each include a second receiver and a second beam splitter facing away from the fourth side, and the second beam splitter and the second receiver at the fourth side correspond to each other and the second beam splitter is farther from the fourth side than the second receiver; the first beam splitter and the second beam splitter are configured to partially transmit and partially reflect the emitted infrared rays, the first receiver is configured to receive the infrared rays transmitted through the first beam splitter, and the second receiver is configured to receive the infrared rays transmitted through the second beam splitter.

For example, the first beam splitter and the second beam splitter respectively comprise a trans-reflective surface and a reflective surface, the trans-reflective surface and the reflective surface of the first beam splitter form therebetween an angle less than 180°, and the trans-reflective surface and the reflective surface of the second beam splitter form therebetween an angle less than 180°.

For example, the infrared touch screen is of a rectangle shape, the first side and the second side are the length sides of the rectangle, and the third side and the fourth side are the width sides of the rectangle; the light sources are distributed uniformly at the first side, the first detecting units are distributed uniformly at the second side, the second detecting units are distributed uniformly at the third side and the fourth side; and the number of the first detecting units are twice of the number of the second detecting units at the third side.

For example, the first detecting units are divided from the middle into a left side group and a right side group with a same number, the left side group is adjacent to the third side, and the right side group is adjacent to the fourth side; the first detecting units of the left side group are symmetric with the first detecting units of the right side group, and the second detecting units at the third side are symmetric with the second detecting units at the fourth side.

For example, the trans-reflective surface of the first beam splitter of the left side group faces the trans-reflective surface of the second beam splitter at the third side; and the trans-reflective surface of the first beam splitter of the right side group faces the trans-reflective surface of the second beam splitter at the fourth side.

For example, the infrared touch screen is of a square shape, the light sources are distributed uniformly at the first side, the first detecting units are distributed uniformly at the second side, and the second detecting units are distributed uniformly at the third side and the fourth side; and the number of the first detecting units is equivalent to that of the second detecting units at the third side.

For example, the second detecting units at the third side are symmetric with the second detecting units at the fourth side; the trans-reflective surface of the first beam splitter faces the trans-reflective surface of the second beam splitter at the third side, or the trans-reflective surface of the first beam splitter faces the trans-reflective surface of the second beam splitter at the fourth side.

For example, the first beam splitter and the second beam splitter are respectively of a triangular prism shape, the trans-reflective surface and the reflective surface respectively are two side surfaces of the triangular prism, a third side surface of the triangular prism and the trans-reflective surface form therebetween an angle of 22.5°, the trans-reflective surface and the reflective surface of the first beam splitter form therebetween an angle of 67.5°, and the trans-reflective surface and the reflective surface of the second beam splitter form therebetween an angle of 112.5°; and the third side surface of the first beam splitter is correspondingly attached to the second receiver and the third side surface of the second beam splitter is correspondingly attached to the second receiver.

For example, the trans-reflective surface comprises a semi-transmissive semi-reflective surface or a one-third transmissive and two-third reflective surface.

Embodiments of the present invention further provide a display device, comprising the above infrared touch screen.

The display device provided by the embodiments of the present invention adopts the above infrared touch screen, thus the touch display performance of the display device is improved.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

FIG. 9 is schematic view that the first detecting units and the second detecting units corresponding to the finger touch points of points 1-9 receive rays in FIG. 8;

REFERENCE SIGNS 1. first side; 11. light source; 2. second side; 21. first detecting unit; 211. first beam splitter; 212. first receiver; 3. third side; 31. second detecting unit; 311. second beam splitter; 312. second receiver; 4. fourth side; 5. trans-reflective surface; 6. reflective surface; 7. third side surface; 8. infrared receiving tube; 9. coated lens; 10. infrared emitting tube.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
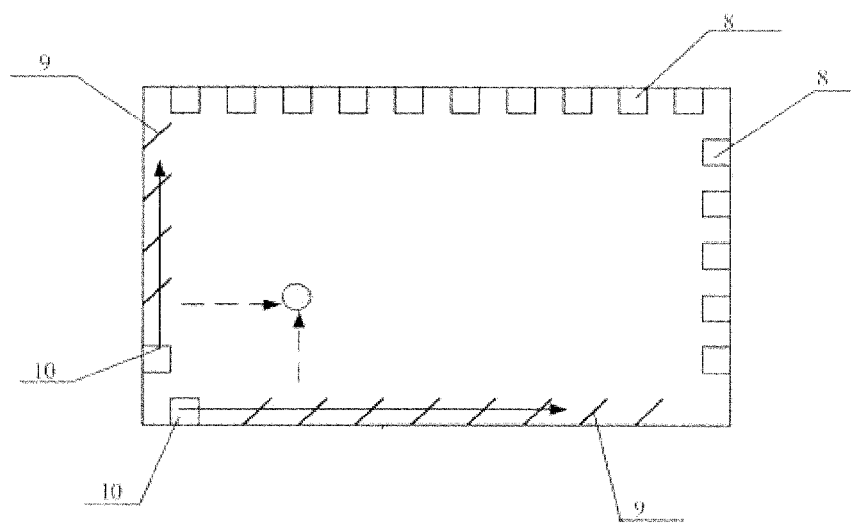
FIG. 1 is a top view of the structure of an infrared touch screen.

FIG. 1 is a schematic view of an infrared touch screen. As illustrated in FIG. 1, the infrared touch screen comprises a quadrilateral display panel, the display panel comprises a first side, a second side, a third side and a fourth side, wherein the first side and the second side are disposed adjacent each other (for example, the upper side and the right side), the first side and the third side are disposed opposite to each other, and the third side and the fourth side are disposed adjacent each other (for example, the lower side and the left side). Both the adjacently disposed first side and second side are provided with a plurality of infrared receiving tubes 8, both the third side and the fourth side are respectively provided with a plurality of coated lenses 9, the third side and the fourth side are respectively provided with an infrared emitting tube that emits infrared rays to the coated lens 9 of the side, and the coated lens 9 and the received infrared rays make an angle, which is configured to reflect the received infrared rays partially to the corresponding infrared receiving tube 8, and transmit the received infrared rays partially to the adjacent coated lens 9.

The above infrared touch screen uses one infrared emitting tube and a plurality of coated lens to substitute the plurality of emitting tubes at the adjacent two sides on the traditional display panel, and through adjusting the angle between the coated lens and the incident rays, the incident rays can be accurately received by the corresponding infrared receiving tubes, thereby achieving the effect of the infrared touch screen. In the above infrared touch screen, the number of the infrared emitting tubes is reduced from many to two, which saves costs, but the infrared rays emitted from each infrared emitting tube are subjected to a plurality of beam splittings, the more one light beam is splitted, the weaker the light intensity of the light beam is, thus the touch of infrared touch screen is easily interfered by the external environment, and thereby the touch performance of the infrared touch screen is greatly impaired.

Embodiment 1

Figure 2:
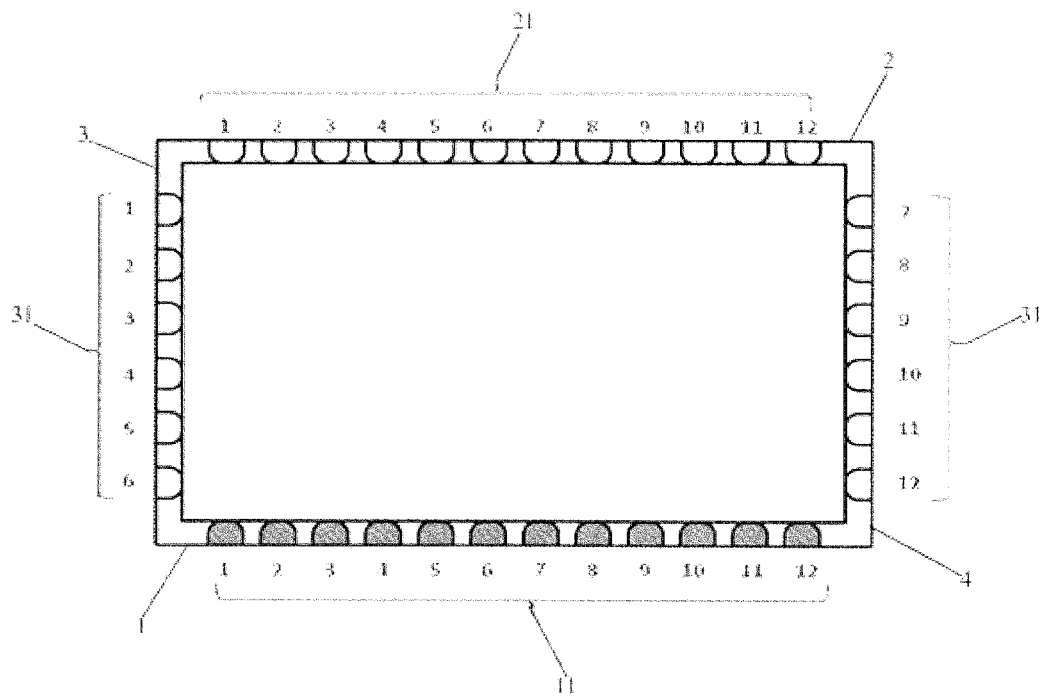
FIG. 2 is a top view of the structure of the infrared touch screen according to embodiment 1 of the present invention.

The present embodiment provides an infrared touch screen, as illustrated in FIG. 2, the infrared touch screen is a quadrilateral, the first side 1 of the infrared touch screen is provided with a plurality of light sources 11, the second side 2 opposite to the first side 1 is arranged with a plurality of first detecting units 21, and the third side 3 and the fourth side 4 opposite to each other are respectively arranged with a plurality of second detecting units 31. Both the first detecting units 21 and the second detecting units 31 can partially receive and partially reflect the infrared rays emitted from the light sources 11, so that the infrared rays emitted from the light sources 11 can form criss-crossing light paths.

In the infrared touch screen in the present embodiment, compared with the manner that the infrared emitting tubes (i.e., the infrared light sources) are arranged at the two adjacent sides of the quadrilateral screen, the number of the light sources 11 is reduced greatly, and thereby the power consumption of the touch screen is reduced; meanwhile, a relatively large number of light sources 11 with relative large numbers are kept. Thus, the light intensity of the touch screen in the present embodiment during touch is relative high and will not be interfered by the external environment, thereby further improving the touch performance of the touch screen.

In the present embodiment, the number of the light sources 11 is equal to that of the first detecting units 21 which correspond to the light sources 11 one by one; the number of the second detecting units 31 at the third side 3 is equal to that of the second detecting units at the fourth side 4, which correspond to each other one by one; and the number of the first detecting units 21 is greater than that of the second detecting units 31 at the third side 3. By this arrangement, after the infrared rays emitted from the light sources 11 have been received and reflected by the first detecting units 21 and the second detecting units 31, it is ensured that the infrared ray has certain intensity during infrared touch while the function of infrared touch is achieved, so that infrared touch will not be interfered by ambient light.

Figure 3:
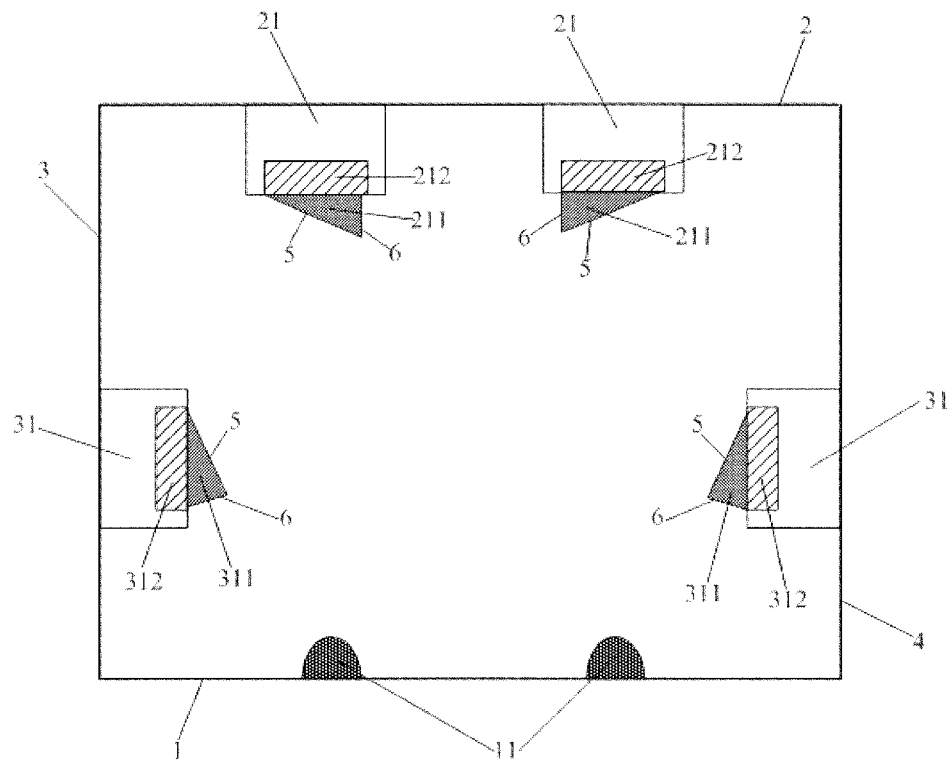
FIG. 3 is a top view of the structures of the first detecting units and the second detecting units in FIG. 2.

As illustrated in FIG. 3, the first detecting unit 21 comprises a first beam splitter 211 and a first receiver 212 facing the light sources 11, the first beam splitter 211 and the first receiver 212 correspond to each other and the first beam splitter 211 is nearer to the light sources 11 than the first receiver 212.

The second detecting units 31 at the third side 3 comprises a second beam splitter 311 and a second receiver 312 facing away from the third side 3, the second beam splitter 311 and the second receiver 312 at the third side 3 correspond to each other and the second beam splitter 311 is farther from the third side 3 than the second receiver 312.

The second detecting units 31 at the fourth side 4 comprise the second beam splitter 311 and the second receiver 312 facing away from the fourth side 4, and the second beam splitter 311 and the second receiver 312 at the fourth side 4 correspond to each other and the second beam splitter 311 is farther from the fourth side 4 than the second receiver 312.

The first beam splitter 211 and the second beam splitter 311 are configured to partially transmit and partially reflect the incident infrared rays, the first receiver 212 is configured to receive the infrared rays transmitted through the first beam splitter 211, and the second receiver 312 is configured to receive the infrared rays transmitted through the second beam splitter 311.

The first beam splitter 211 and the second beam splitter 311 respectively comprise a trans-reflective surface 5 and a reflective surface 6, the trans-reflective surface 5 and the reflective surface 6 of the first beam splitters 211 form therebetween an angle less than 180°, and the trans-reflective surface 5 and the reflective surface 6 of the second beam splitter 311 form therebetween an angle less than 180°. By this arrangement, it is convenient for the first beam splitter 211 and the second beam splitter 311 to reflect and transmit the infrared rays emitted from the light sources 11, so that the infrared touch screen can achieve the infrared touch function.

In the present embodiment, as illustrated in FIGS. 2 and 3, the infrared touch screen is in a quadrilateral shape, the first side 1 and the second side 2 are the length sides of the quadrilateral, and the third side 3 and the fourth side 4 are the width sides of the quadrilateral; the light sources 11 are distributed uniformly at the first side 1, the first detecting units 21 are distributed uniformly at the second side 2, the second detecting units 31 are distributed uniformly at the third side 3 and the fourth side 4; and the number of the first detecting units 21 is twice of that of the second detecting units 31 at the third side 3.

The first detecting units 21 are divided from the middle into a left side group and a right side group with the same number, the left side group is adjacent to the third side 3, and the right side group is adjacent to the fourth side 4; the first detecting units 21 of the left side group are symmetric with the first detecting units 21 of the right side group, and the second detecting units 31 at the third side 3 are symmetric with the second detecting units 31 at the fourth side 4.

In the present embodiment, the trans-reflective surface 5 of the first beam splitter 211 of the left side group faces the trans-reflective surface 5 of the second beam splitter 311 at the third side 3; and the trans-reflective surface 5 of the first beam splitter 211 of the right side group faces the trans-reflective surface 5 of the second beam splitter 311 at the fourth side 4.

Figure 4:
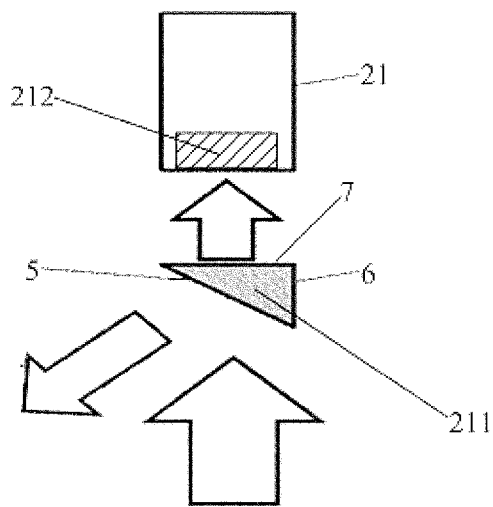
FIG. 4 is a schematic view of the light path principle that the first detecting units transmit and reflect infrared rays in FIG. 3.
Figure 5:
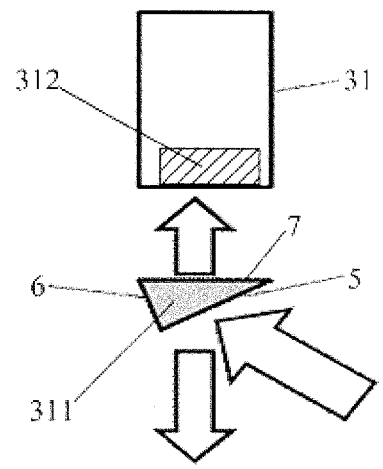
FIG. 5 is a schematic view of the light path principle that the second detecting units transmit and reflect infrared rays in FIG. 3.

As illustrated in FIGS. 4 and 5, the first beam splitter 211 and the second beam splitter 311 respectively present a triangular prism shape. It should be described that the triangular prism has three side surfaces and two bottom surfaces parallel to each other, and the trans-reflective surface 5 and the reflective surface 6 respectively are two side surfaces of the triangular prism. For example, the third side surface 7 of the triangle prism and the trans-reflective surface 5 form therebetween an angle of 22.5°, the trans-reflective surface 5 and the reflective surface 6 of the first beam splitter 211 form therebetween an angle of 67.5°, and the trans-reflective surface 5 and the reflective surface 6 of the second beam splitter 311 form therebetween an angle of 112.5°. The third side surface 7 (i.e., the third side surface 7 of the triangular prism) of the first beam splitter 211 is correspondingly attached to the first receiver 212, and the third side surface 7 (the third side surface 7 of the triangular prism) of the second beam splitter 311 is correspondingly attached to the second receiver 312.

The first beam splitter 211 splits an incident ray as follows: the incident ray is emitted into the trans-reflective surface 5 of the first beam splitter 211, the transmitted ray is emitted to and received by the first receiver 212; the rays reflected by the trans-reflective surface 5 is emitted out of the trans-reflective surface 5.

The second beam splitter 311 splits an incident ray as follows: the incident light is emitted to the trans-reflective surface 5 of the second beam splitter 311, part of the transmitted light is reflected by the reflective surface 6 and emitted to and received by the second receiver 312; and the rays reflected by the trans-reflective surface 5 is emitted out of the trans-reflective surface 5.

Figure 6:
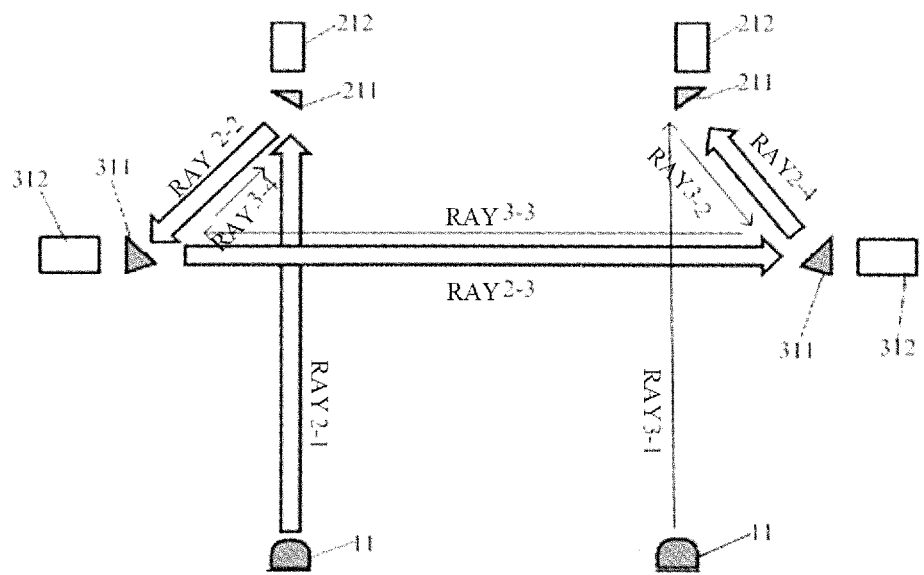
FIG. 6 is a schematic view of the light path formed by a left side light source and a right side light source of the infrared touch screen in FIG. 2.

As illustrated in FIG. 6, according to the structure arranged according to FIGS. 2-5, the rays (such as ray 2-1) emitted from one of the light sources 11 corresponding to the first detecting units 21 of the left side group can be emitted to one of the first detecting units 21 corresponding to it, the incident rays are transmitted and reflected by the first beam splitter 211 of the first detecting units 21, and the incident rays are divided into two beams (i.e., a first transmissive beam and a first reflective beam). The first reflective beam (for example, ray 2-2) can be emitted to one of the second beam splitters 311 at the third side 3 and then divided into two beams through the second beam splitter 311 (i.e., a second transmissive beam and a second reflective beam), the second reflective beam (for example, ray 2-3) can be emitted to one corresponding second splitter 311 at the fourth side 4, and then a group of light paths (i.e., light paths formed by the criss-crossing of rays 2-1 and rays 2-3) can be formed at the infrared touch screen. The criss-crossing point of the group of light paths can serve as an infrared sensing point. When a user touches the screen, the finger will block the infrared ray passing the infrared sensing point, and then the first detecting unit 21 and the second detecting unit 31 which cannot receive the blocked infrared ray can judge the specific position of the infrared sensing point at the touch screen according to the situation of the actually received infrared ray signal. In addition, the second reflective beam (for example, ray 2-3) can be divided into two beams (i.e., a third transmissive beam and a third reflective beam) through the second beam splitter 311 at the fourth side 4, the third reflective beam (for example, the ray 2-4) can be emitted to one of the first detecting units 21 in the right side group, the ray transmitted by the trans-reflective surface 5 of the first detecting unit 21 in the right side group is emitted to the reflective surface 6 of its first beam splitter 211, and the ray reflected by the reflective surface 6 is emitted to the its first receiver 212 and received; and the ray reflected by the trans-reflective surface 5 of the first detecting unit 21 in the right side group is emitted out of the trans-reflective surface 5 and then emitted to one corresponding light source 11. Likewise, each light source 11 corresponding to the first detecting unit 21 in the right side group can also form the same light path, while the direction of the light path is just opposite to that of the light path formed by each light source 11 corresponding to the first detecting unit 21 in the left side group (for example, the light paths formed by the ray 3-1, the ray 3-2, the ray 3-3 and the ray 3-4). According to the above principle of forming the light path, each light source 11 can form a plurality of identical light paths through the first detecting unit 21 and the second detecting unit 31, thus the touch function of the overall touch screen is achieved.

Compared with the infrared touch screen in FIG. 1, the infrared touch screen in this embodiment has more light sources 11 in the precondition of achieving infrared touch, and the infrared touch function can be achieved when the infrared ray emitted by each light source 11 is divided into three beams, which can ensure high light intensity of the beams of the infrared ray, so that the touch screen will not be interfered by ambient light when touched, and then the touch performance of the touch screen is improved.

In this embodiment, the trans-reflective surface 5 is a semi-transmissive semi-reflective surface. It should be indicated that the trans-reflective surface 5 can also be a one-third transmissive two-third reflective surface, or a trans-reflective surface 5 which distributes transmissive light and reflective light according to other ratios.

Figure 7:
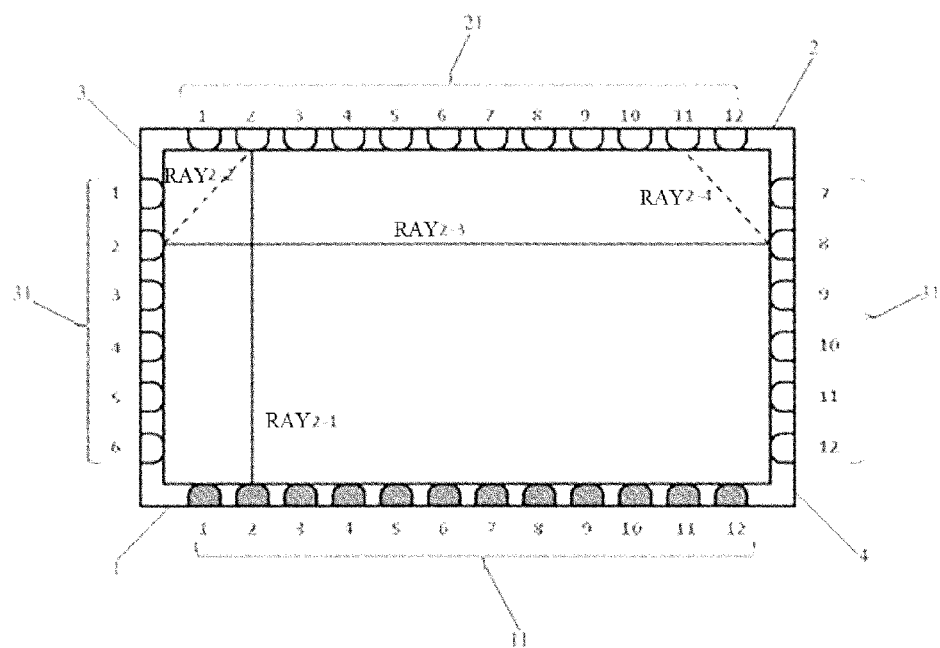
FIG. 7 is a schematic view of the light path formed by one of the light sources of the infrared touch screen in FIG. 2.

The course of the light path of the infrared touch screen with the above structure is specifically illustrated in FIG. 7 (the course of the light path of one light source 11-2 is taken as an example). The infrared ray 2-1 emitted by the light source 11-2 is emitted to the first detecting unit 21-2, the reflected ray is 2-2, the ray 2-2 is emitted to the second detecting unit 31-2, the reflected ray 2-3 is emitted to the second detecting unit 31-8, and the second detecting unit 31-8 will reflect a part of the ray 2-4 to the first detecting unit 21-11.

Figure 8:
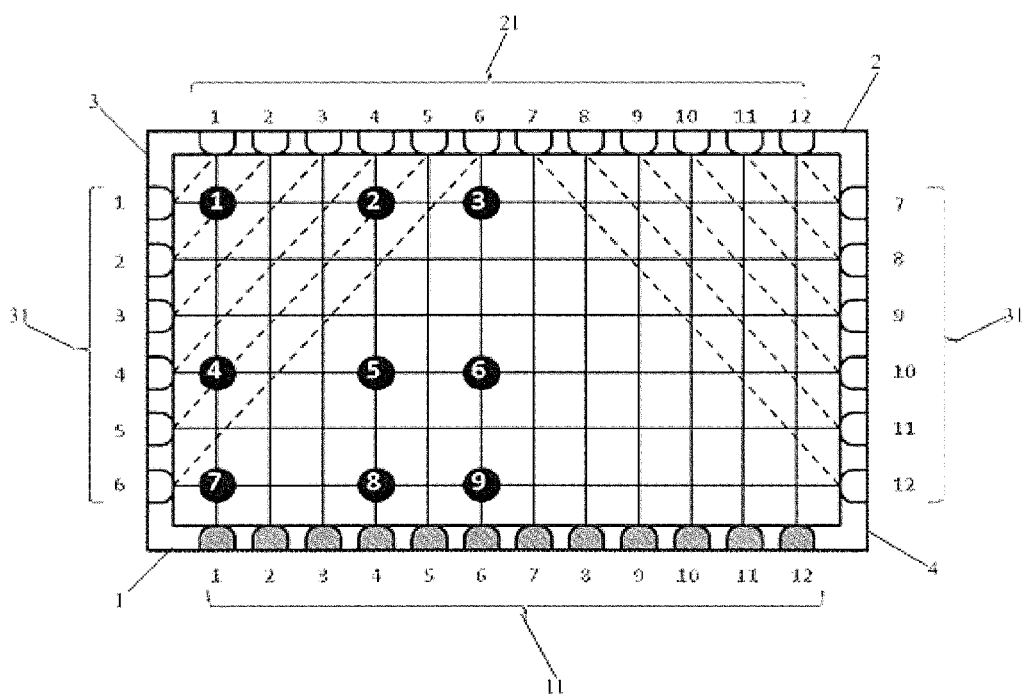
FIG. 8 is a schematic view of the integral light path formed by all of the light sources of the infrared touch screen in FIG. 2.

The infrared touch light path of the overall infrared touch screen as illustrated in FIG. 8 can be formed according to the above light path course. In the figure, points 1-9 are supposed finger touch points (that is, suppose fingers touch such points). FIG. 9 illustrates the situation that the first detecting unit 21 and the second detecting unit 31 corresponding to the points 1-9 receive the rays, in which "x" indicates that the first detecting unit 21 or the second detecting unit 31 has not received the rays and "J" indicates that the first detecting unit 21 or the second detecting unit 31 has received the rays. According to the situation in FIG. 9 of receiving signals by respective first detecting units 21 and respective second detecting units 31, the positions of the touch points of the fingers are judged. Specifically, the positions of the touch points of the fingers are judged according to the situation of receiving signals by the first detecting units 21 and the second detecting units 31 through program, which can be obtained through program compiling and is not detailed herein.

Embodiment 2

Figure 10:
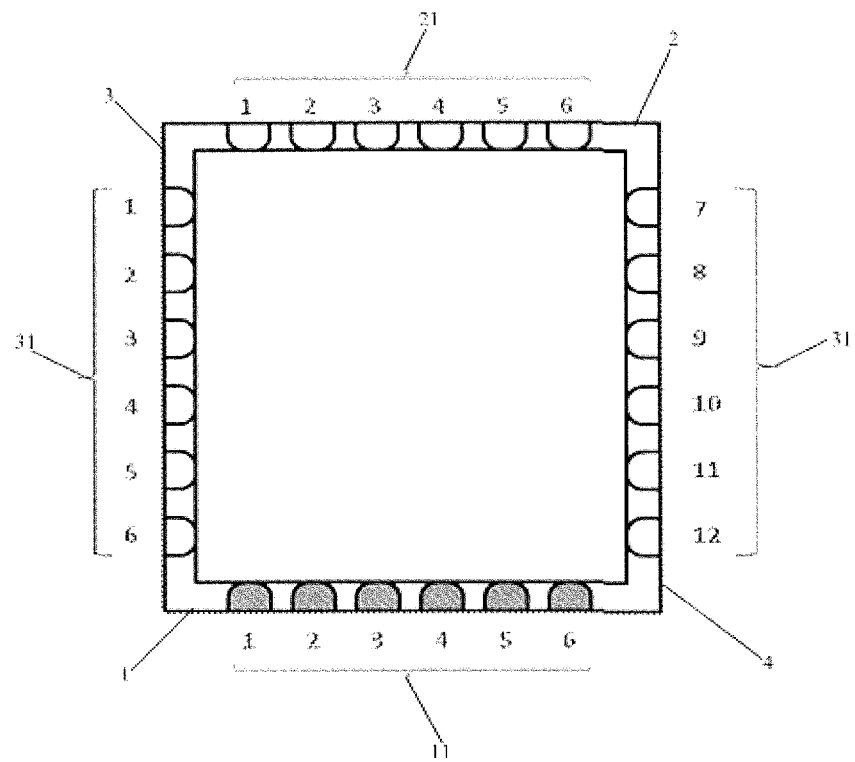
FIG. 10 is a top view of the structure of the infrared touch screen according to embodiment 2 of the present invention.

This embodiment provides an infrared touch screen, and being different from the embodiment 1, as illustrated in FIG. 10, the infrared touch screen is a square, the light sources 11 are evenly distributed at the first side 1, the first detecting units 21 are evenly distributed at the second side 2, and the second detecting units 31 are evenly distributed at the third side 3 and the fourth side 4; and the number of the first detecting units 21 is equal to that of the second detecting units 31 at the third side 3.

Figure 11:
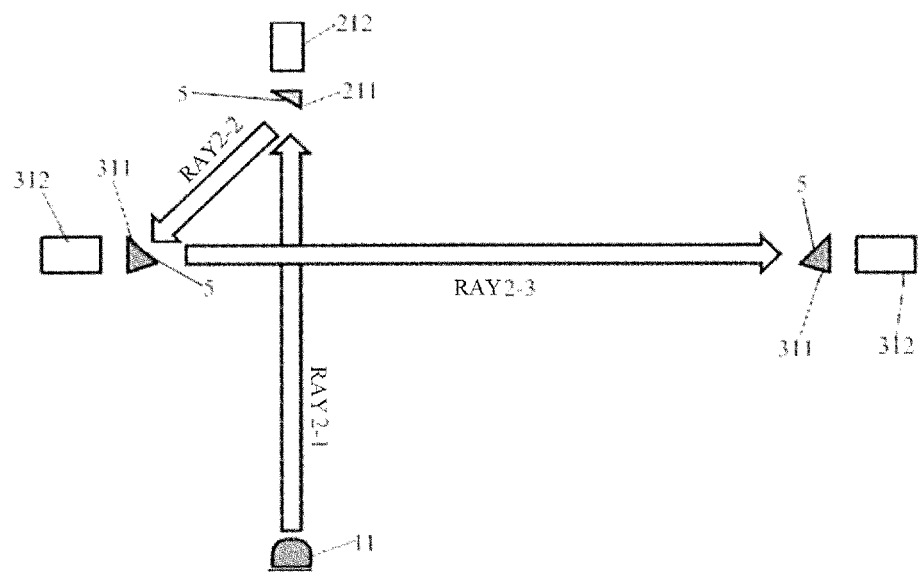
FIG. 11 is a schematic view of the light path formed by one of the light sources of the infrared touch screen in FIG. 10.

Correspondingly, the second detecting units 31 at the third side 3 are symmetric to the second detecting units 31 at the fourth side 4; as illustrated in FIG. 11, the trans-reflective surface 5 of the first beam splitter 211 faces the trans-reflective surface 5 of the second beam splitter 311 at the third side 3.

The other structures of the infrared touch screen in this embodiment are the same with embodiment 1 and then not detailed herein.

Through the above structure of the infrared touch screen in this embodiment, the ray (for example, ray 2-1) emitted from one light source 11 can be emitted to one corresponding first detecting unit 21, and the incident ray is transmitted and reflected by the first beam splitter 211 of the first detecting unit 21 and then divided into two beams (i.e., a first transmissive beam and a first reflective beam), and the first reflective beam (for example, ray 2-2) can be emitted to one of the second beam splitters 311 at the third side 3, the first reflective beam is divided by the second beam splitter 311 into two beams (that is, a second transmissive beam and a second reflective beam), the second reflective beam (for example, ray 2-3) can be emitted to one corresponding second beam splitter 311 at the fourth side 4, thus, a group of criss-crossing light paths (that is, light paths formed by the criss-crossing ray 2-1 and ray 2-3) can be formed at the infrared touch screen. According to the above principle of forming the light paths, the respective light sources 11 can form a plurality of groups of identical light paths through the first detecting unit 21 and the second detecting unit 31, thus the touch function of the overall infrared touch screen is achieved.

It needs to be indicated that the trans-reflective surface 5 of the first beam splitter 211 can also face the trans-reflective surface 5 of the second beam splitter 311, and the touch function of the infrared touch screen can also be achieved.

Embodiment 3

This embodiment provides an infrared touch screen, being different from embodiments 1-2, the infrared touch screen is in any quadrilateral shape other than rectangle and square, as long as the angle between the trans-reflective surface and the reflective surface of the first beam splitter and the second beam splitter is adjusted correspondingly, which finally ensures forming the criss-crossing light paths by the infrared ray emitted by the light sources, and achieves the touch function of the infrared touch screen.

In the infrared touch screen provided by embodiments 1-3, a plurality of light sources are disposed at the first side of the quadrilateral infrared touch screen, a plurality of first detecting units are disposed at the second side thereof, and a plurality of second detecting units are disposed at the third side and the fourth side thereof; the first detecting units and the second detecting units receive and reflect the infrared ray emitted by the light sources, so that the infrared ray emitted by the light sources forms criss-crossing light paths, thus the infrared touch function of the infrared touch screen is achieved; compared with traditional infrared touch screens, the number of the light sources is reduced greatly, and then the power consumption of the infrared touch screen is lowered; moreover, the infrared touch function of the touch screen can be achieved as long as the infrared ray emitted by each light source only needs to be divided into three light beams, which ensures relatively high light intensity of the light beams of the infrared ray, and then the touch screen will not be interfered by ambient light in the case of infrared touch, and the touch performance of the touch screen is improved.

Embodiment 4

This embodiment provides a display device comprising the infrared touch screen according to any of embodiments 1-3.

The touch display performance of the display device is improved through using the infrared touch screen according to any of embodiments 1-3.

For the infrared touch screen provided by this embodiment, a plurality of light sources are disposed at the first side of the quadrilateral infrared touch screen, a plurality of first detecting units are disposed at the second side thereof, and a plurality of second detecting units are disposed at the third side and the fourth side thereof; the first detecting units and the second detecting units receive and reflect the infrared rays emitted by the light sources, so that the infrared rays emitted by the light sources form criss-crossing light paths, thus the infrared touch function of the infrared touch screen is achieved; compared with traditional infrared touch screens, the number of the light sources is reduced greatly, and then the power consumption of the infrared touch screen is lowered; moreover, the infrared touch function of the touch screen can be achieved as long as the infrared ray emitted by each light source only needs to be divided into three light beams, which ensures relatively high light intensity of the light beams of the infrared light, and then the touch screen will not be interfered by ambient light in the case of infrared touch, and the touch performance of the touch screen is improved.

Described above are just exemplary embodiments of the present invention, which are not intended to restrict the scope of protection of the present invention, and the scope of protection of the present invention shall be determined by the appended claims.

The present application claims the priority of Chinese patent application No. 201410336365.1 filed on Jul. 15, 2014, and the disclosure of Chinese patent application is incorporated herein on its entirety as a part of the present application.

The invention claimed is:

1. An infrared touch screen, the infrared touch screen is of a quadrilateral shape, wherein, the infrared touch screen is arranged with a plurality of light sources at its first side and arranged with a plurality of first detecting units at its second side opposite to the first side, and is arranged with a plurality of second detecting units respectively at its third side and its fourth side opposite to each other, both the first detecting units and the second detecting units are configured to partially receive and partially reflect the infrared rays emitted from the light sources, so that the infrared rays emitted from light sources form criss-crossing light paths, wherein the infrared touch screen is of a square shape, the light sources are distributed uniformly at the first side, the first detecting units are distributed uniformly at the second side, and the second detecting units are distributed uniformly at the third side and the fourth side; and the number of the first detecting units is equivalent to that of the second detecting units at the third side, the first detecting units each include a first receiver and a first beam splitter facing the light sources, and the first beam splitter and the first receiver correspond to each other and the first beam splitter is nearer to the light sources than the first receiver, the second detecting units at the third side each include a second received and a second beam splitter facing away from the third side, and the second beam splitter and the second receiver at the third side correspond to each other and the second beam splitter is farther form the third side than the second receiver;

the second detecting units at the fourth side each include a second receiver and a second beam splitter facing away from the fourth side, and the second beam splitter and the second receiver at the fourth side correspond to each other and the second beam splitter is farther from the fourth side than the second receiver; and the first beam splitter and the second beam splitter are configured to partially transmit and partially reflect incident infrared rays, the first receiver is configured to receive the infrared rays transmitted through the first beam splitter, and the second receiver is configured to receive the infrared rays transmitted through the second beam splitter, the first beam splitter and the second beam splitter respectively comprise a trans-reflective surface and a reflective surface, the trans-reflective surface and the reflective surface of the first beam splitter form therebetween an angle less than 180°, and the trans-reflective surface and the reflective surface of the second beam splitter form therebetween an angle less than 180°, the first beam splitter and the second beam splitter are respectively of a triangular prism shape, the trans-reflective surface and the reflective surface respectively are two side surfaces of the triangular prism, a third side surface of the triangular prism and the trans-reflective surface form therebetween an angle of 22.5°, the trans-reflective surface and the reflective surface of the first beam splitter form therebetween an angle of 67.5°, and the trans-reflective surface and the reflective surface of the second beam splitter form therebetween an angle of 112.5°; and the third side surface of the first beam splitter is correspondingly attached to the first receiver, and the third side surface of the second beam splitter is correspondingly attached to the second receiver.

2. The infrared touch screen according to claim 1, wherein a number of the light sources is equal to that of the first detection units which correspond to the light sources one by one; a number of the second detecting units at the third side is equal to that of the second detecting units at the fourth side, the second detecting units at the third side and the second detecting units at the fourth side corresponding to each other one by one.

3. The infrared touch screen according to claim 1, wherein, the first detecting units are divided from the middle into a left side group and a right side group with a same number, the left side group is adjacent to the third side, and the right side group is adjacent to the fourth side;

the first detecting units of the left side group are symmetric with the first detecting units of the right side group, and the second detecting units at the third side are symmetric with the second detecting units at the fourth side.

4. The infrared touch screen according to claim 3, wherein, the trans-reflective surface of the first beam splitter of the left side group faces the trans-reflective surface of the second beam splitter at the third side; and the trans-reflective surface of the first beam splitter of the right side group faces the trans-reflective surface of the second beam splitter at the fourth side.

5. The infrared touch screen according to claim 1, wherein, the second detecting units at the third side are symmetric with the second detecting units at the fourth side;

the trans-reflective surface of the first beam splitter faces the trans-reflective surface of the second beam splitter at the third side, or the trans-reflective surface of the first beam splitter faces the trans-reflective surface of the second beam splitter at the fourth side.

6. The infrared touch screen according to claim 1, wherein the trans-reflective surface comprises a semi-transmissive semi-reflective surface or a one-third transmissive and two-third reflective surface.

7. A display device, comprising the infrared touch screen according to claim 1.

8. The display device according to claim 7, wherein a number of the light sources is equal to that of the first detection units which correspond to the light sources one by one; a number of the second detecting units at the third side is equal to that of the second detecting units at the fourth side, the second detecting units at the third side and the second detecting units at the fourth side corresponding to each other one by one.

9. The display device according to claim 7, wherein, the first detecting units are divided from the middle into a left side group and a right side group with a same number, the left side group is adjacent to the third side, and the right side group is adjacent to the fourth side;

the first detecting units of the left side group are symmetric with the first detecting units of the right side group, and the second detecting units at the third side are symmetric with the second detecting units at the fourth side.

10. The display device according to claim 9, wherein, the trans-reflective surface of the first beam splitter of the left side group faces the trans-reflective surface of the second beam splitter at the third side; and the trans-reflective surface of the first beam splitter of the right side group faces the trans-reflective surface of the second beam splitter at the fourth side.

11. The display device according to claim 7, wherein, the second detecting units at the third side are symmetric with the second detecting units at the fourth side;

the trans-reflective surface of the first beam splitter faces the trans-reflective surface of the second beam splitter at the third side, or the trans-reflective surface of the first beam splitter faces the trans-reflective surface of the second beam splitter at the fourth side.

12. The display device according to claim 7, wherein the trans-reflective surface comprises a semi-transmissive semi-reflective surface or a one-third transmissive and two-third reflective surface.

* * * * *